United States Patent
Hao et al.

(10) Patent No.: US 9,597,979 B1
(45) Date of Patent: Mar. 21, 2017

(54) METHOD OF CONTROLLING REGENERATION AND BOOST FUNCTIONS OF A HYBRID POWERTRAIN

(71) Applicant: GM GLOBAL TECHNOLOGY OPERATIONS LLC, Detroit, MI (US)

(72) Inventors: Lei Hao, Troy, MI (US); Venkata Prasad Atluri, Farmington Hills, MI (US); Suresh Gopalakrishnan, Troy, MI (US); Chandra S. Namuduri, Troy, MI (US); Avoki M. Omekanda, Rochester, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 15/097,439

(22) Filed: Apr. 13, 2016

(51) Int. Cl.
 *B60W 20/00* (2016.01)
 *B60L 15/20* (2006.01)

(52) U.S. Cl.
 CPC ......... *B60L 15/2045* (2013.01); *B60W 20/14* (2016.01); *B60W 20/19* (2016.01); *B60L 2260/20* (2013.01); *B60W 2710/083* (2013.01); *B60W 2710/088* (2013.01); *Y10S 903/906* (2013.01)

(58) Field of Classification Search
 CPC . B60L 15/2075; B60L 2260/20; B60W 20/14; B60W 20/19; B60W 2710/083; B60W 2710/088; Y10S 903/906
 USPC .......................................................... 701/22
 See application file for complete search history.

(56) References Cited

U.S. PATENT DOCUMENTS

2016/0052505 A1* 2/2016 Zhou .................. B60L 7/14
 701/22

* cited by examiner

*Primary Examiner* — Marthe Marc-Coleman
(74) *Attorney, Agent, or Firm* — Quinn Law Group (57) ABSTRACT

A method of controlling a powertrain of a hybrid vehicle includes comparing an operating efficiency of a motor-generator-inverter to an upper MGI efficiency threshold when a boost operating mode is selected. When the operating efficiency of the motor-generator-inverter is equal to or greater than the upper MGI efficiency threshold, the motor-generator-inverter is controlled to operate in the boost operating mode. The operating efficiency of the motor-generator-inverter is compared to a lower MGI efficiency threshold when a regenerative operating mode is selected. When the operating efficiency of the motor-generator-inverter is equal to or greater than the lower MGI efficiency threshold, the motor-generator-inverter is controlled to operate in the regenerative operating mode.

20 Claims, 3 Drawing Sheets

METHOD OF CONTROLLING REGENERATION AND BOOST FUNCTIONS OF A HYBRID POWERTRAIN

TECHNICAL FIELD

The disclosure generally relates to a method of controlling a hybrid powertrain, and more specifically to a method of operating an electric motor-generator-inverter in either a boost operating mode to provide tractive power, or in a regenerative operating mode to re-charge an energy storage device.

BACKGROUND

Most non-hybrid vehicles include an internal combustion engine coupled to a transmission and a final drive to rotate wheels that move the vehicle. To start the engine of a non-hybrid vehicle, a starter motor is energized, which causes a crankshaft of the engine to turn and start the engine.

Many hybrid electric vehicles utilize both an electric motor-generator and an internal combustion engine to offer reduced fuel consumption and emissions. One type of hybrid electric vehicle utilizes a belted-alternator-starter (BAS). The BAS utilizes a motor-generator coupled to a crankshaft of the engine, usually by a belt and pulley system. The motor-generator can draw power from an energy storage device to generate torque that is used to rotate the engine when a brake is released at a stop light, in order to start the engine, or to supplement engine drive torque that is used to propel the vehicle. When torque from the electric motor-generator is used to supplement torque from the engine for vehicle propulsion, the hybrid vehicle is often referred to as operating in a "boost" operating mode. The electric motor-generator may also be rotated by the engine to generate electricity that is used to recharge the energy storage device. When the electric motor-generator is powered by the engine to generate electricity for charging the energy storage device, the hybrid vehicle is often referred to as operating in a "regenerative" operating mode. A hybrid system controller controls the operation of the electric motor-generator to operate the electric motor-generator in either the boost operating mode or the regenerative operating mode.

SUMMARY

A method of controlling a powertrain of a vehicle is provided. The powertrain includes an internal combustion engine, a motor-generator-inverter selectively coupled to the internal combustion engine, and at least one energy storage device selectively coupled to the motor-generator-inverter. The method includes selecting one of either a boost operating mode or a regenerative operating mode for the motor-generator-inverter with a hybrid system controller. An operating efficiency of the motor-generator-inverter is calculated with the hybrid system controller. When the boost operating mode is selected, the operating efficiency of the motor-generator-inverter is compared to an upper MGI efficiency threshold, with the hybrid system controller, to determine if the operating efficiency of the motor-generator-inverter is equal to or greater than the upper MGI efficiency threshold, or if the operating efficiency of the motor-generator-inverter is less than the upper MGI efficiency threshold. When the operating efficiency of the motor-generator-inverter is equal to or greater than the upper MGI efficiency threshold, the motor-generator-inverter is controlled with the hybrid system controller to operate the motor-generator-inverter in the boost operating mode. The motor-generator-inverter draws electrical power from the at least one energy storage device for generating torque for the internal combustion engine when operating in the boost operating mode. When the regenerative operating mode is selected, the operating efficiency of the motor-generator-inverter is compared to a lower MGI efficiency threshold, with the hybrid system controller, to determine if the operating efficiency of the motor-generator-inverter is equal to or greater than the lower MGI efficiency threshold, or if the operating efficiency of the motor-generator-inverter is less than the lower MGI efficiency threshold. When the operating efficiency of the motor-generator-inverter is equal to or greater than the lower MGI efficiency threshold, the motor-generator-inverter is controlled with the hybrid system controller to operate the motor-generator-inverter in the regenerative operating mode. The motor-generator-inverter receives torque from the internal combustion engine for generating electricity for charging the at least one energy storage device when operating in the regenerative operating mode.

Accordingly, the hybrid system controller enables the motor-generator-inverter to operate in the boost operating mode or the regenerative operating mode when the operating efficiency of the motor-generator-inverter is greater than a threshold value. The threshold value for operating the motor-generator-inverter in the boost operating mode is the upper MGI efficiency threshold. The threshold value for operating the motor-generator-inverter in the regenerative operating mode is the lower MGI efficiency threshold. The efficiency of the hybrid powertrain is improved by only enabling the motor-generator-inverter to operate in the boost operating mode or the regenerative operating mode when the operating efficiency of the motor-generator-inverter is equal to or greater than the upper MGI efficiency threshold or the lower MGI efficiency threshold respectively.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
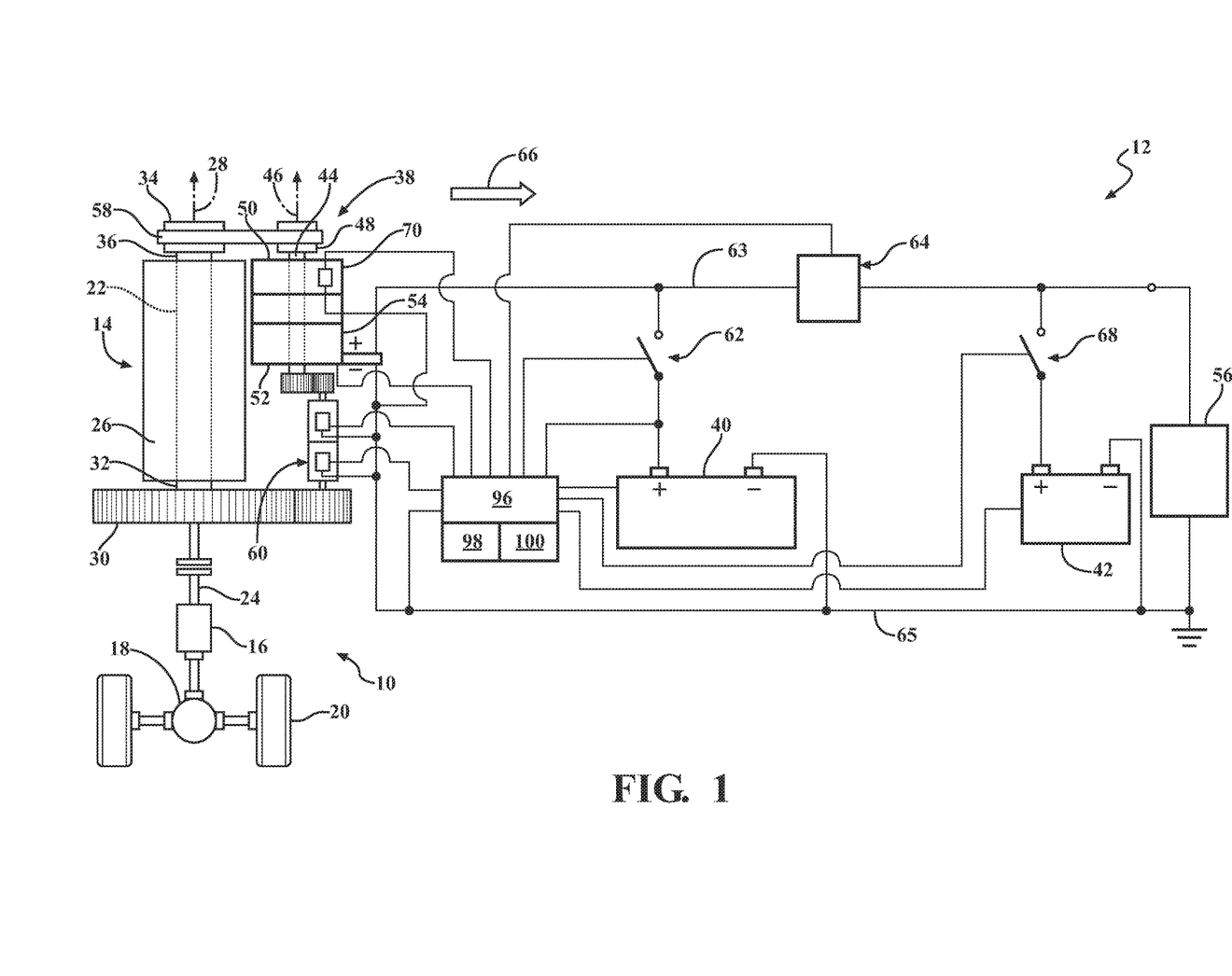
FIG. 1 is a schematic plan view of a powertrain for a vehicle.

Referring to the Figures, wherein like numerals indicate like or corresponding parts throughout the several views, a vehicle is generally shown at 10. An exemplary powertrain 12 for the vehicle 10 is generally shown in the Figures. It should be appreciated that the powertrain 12 shown in FIG. 1 is merely exemplary, and that configuration and/or components of the powertrain 12 may vary from those of the exemplary embodiment described herein. The vehicle 10 that can utilize the powertrain 12 may include an automotive vehicle, such as, a car, a truck, etc. However, it is to be appreciated that the vehicle 10 may alternatively be a non-automotive vehicle, such as, a farm vehicle, a marine vehicle, an aviation vehicle, etc.

Generally, as shown in FIG. 1, the powertrain 12 includes an engine 14, a transmission 16 and a final drive 18, coupleable to each other to rotate wheels 20 of the vehicle 10 in order to propel the vehicle 10. The engine 14 may include an output member or crankshaft 22 which is coupleable to an input member 24 of the transmission 16. The transmission 16 may include a gearing arrangement and one or more clutches through which torque is transferred from the output member 22 of the engine 14 to the input member 24 of the transmission 16, then to the final drive 18 and out to the wheels 20 to move the vehicle 10. The wheels 20 can be front wheels or rear wheels of the vehicle 10. The front and/or the rear wheels 20 may be powered by the powertrain 12.

The powertrain 12 includes the engine 14 as discussed above. For example, the engine 14 may include an internal combustion engine. The engine 14 can include a housing 26 and the crankshaft 22 at least partially disposed inside the housing 26. The crankshaft 22 is rotatable about a longitudinal axis 28. In FIG. 1, the crankshaft 22 is shown schematically without any specific features for illustrative purposes only and it is to be appreciated that the crankshaft 22 can have various configurations to cooperate with other components of the engine 14. The engine 14 can also include a cylinder block, one or more connecting rods, pistons, valves, etc., which will not be discussed further. It is to be appreciated that the engine 14 can be designed to operate on gasoline, diesel fuel, etc.

The powertrain 12 may include a ring gear 30. In certain embodiments, the ring gear 30 is disposed outside of the housing 26. The ring gear 30 is attached to a first distal end 32 of the crankshaft 22 such that the ring gear 30 and the crankshaft 22 are rotatable in unison about the longitudinal axis 28. Simply stated, the ring gear 30 and the crankshaft 22 can rotate as a unit about the longitudinal axis 28.

Additionally, the powertrain 12 may include a rotatable element 34, such as a crankshaft pulley 34, which is rotatable about the longitudinal axis 28. In certain embodiments, the crankshaft pulley 34 is disposed outside of the housing 26 of the engine 14. The crankshaft pulley 34 is coupleable to a second distal end 36 of the crankshaft 22 such that the crankshaft pulley 34 and the crankshaft 22 can be rotatable in unison about the longitudinal axis 28. Specifically, coupleable can include when the crankshaft pulley 34 is directly coupled to the crankshaft 22 or indirectly coupled to the crankshaft 22 by the operation of another mechanism, such as clutching, as discussed further below. Generally, the first and second distal ends 32, 36 of the crankshaft 22 are spaced from each other along the longitudinal axis 28. It is to be appreciated that one or more bearings can rotatably support the crankshaft 22. It is to also be appreciated that the rotatable element 34 can be a sprocket, etc., instead of a pulley.

Furthermore, the powertrain 12 includes a motor-generator 38 coupleable to the engine 14. For example, the motor-generator 38 can be coupled to the outside of the housing 26 of the engine 14 and/or supported by any suitable component adjacent to the engine 14. The motor-generator 38 can be supported by any suitable methods, such as fasteners, brackets, braces, etc. The motor-generator 38 can operate as a motor or as a generator. The powertrain 12 may be referred to as a hybrid powertrain because the powertrain 12 utilizes the motor-generator 38 to assist in reducing fuel consumption and emissions of the vehicle 10. For example, in certain embodiments and/or operating modes, the motor-generator 38 may be used as a motor to start the engine 14 or as a torque assist which provides torque to the crankshaft 22 to assist in propelling the vehicle 10 when the vehicle 10 is moving (utilizing an endless rotatable device 58 discussed below). When torque from the electric motor-generator 38 is used to supplement torque from the engine 14 for vehicle propulsion, the hybrid vehicle 10 may be referred to as operating in a "boost" operating mode. As another example, the motor-generator 38 can be utilized as a generator to generate current, i.e., electricity, or recharge a first energy storage device 40 and/or a second energy storage device 42, as discussed further below. When the motor-generator 38 is generating current/electricity, the current can drive various auxiliary devices of the vehicle 10, which is also discussed further below. When the electric motor-generator 38 is powered by the engine 14 to generate electricity for charging the first energy storage device 40 and/or the second energy storage device 42, the hybrid vehicle is often referred to as operating in a "regenerative" operating mode. While the exemplary embodiment of the vehicle 10 is shown including both the first energy storage device 40 and the second energy storage device 42, it should be appreciated that other embodiments may only include the first energy storage device 40.

One suitable motor-generator 38 is a brushless electric motor-generator. Additionally, the motor-generator 38 can be an alternating current (AC) motor-generator or any other suitable motor-generator. For example, torque being outputted from the AC motor-generator 38 can be from about 15.0 newton meter (Nm) to about 50.0 Nm. The motor-generator 38 may be configured to provide reduced maximum torque requirement, (as compared, for example, to a BAS as discussed in the background section), which allows the mass size of the motor-generator 38 to be decreased and also allows reduced power requirements of the motor-generator 38. It is to be appreciated that the torque being outputted from the motor-generator 38 can be values other than identified above.

The motor-generator 38 may include a motor/generator shaft 44 that can be rotatable about a first axis 46. In certain operations, when the motor/generator shaft 44 rotates, torque can be transferred to the crankshaft 24 as discussed further below. Furthermore, the motor/generator shaft 44 does not move along the first axis 46. Additionally, the first axis 46 is spaced from the longitudinal axis 28. In certain embodiments, the first axis 46 and the longitudinal axis 28 are spaced from each other and substantially parallel to each other. Therefore, the motor/generator shaft 44 and the crankshaft 22 are offset from each other. It is to be appreciated that the motor/generator shaft 44 can be split into more than one piece, e.g., more than one piece to accommodate the operation of one or more clutches, etc.

The motor-generator 38 may include a rotatable element 48, such as a motor/generator pulley 48, being coupleable to the motor/generator shaft 44 adjacent to a first end 50 of the motor-generator 38. Specifically, the motor/generator pulley 48 can be disposed outside of the first end 50 of the motor-generator 38. The motor/generator pulley 48 can also be rotatable about the first axis 46. For certain operations, the motor/generator shaft 44 and the motor/generator pulley 48 can rotate in unison about the first axis 46. In other operations, the motor/generator shaft 44 and the motor/generator pulley 48 are not rotatable in unison, i.e., rotatable separately or one rotatable while the other remains stationary (does not rotate). Coupleable can include when the motor/generator pulley 48 is directly coupled to the motor/generator shaft 44 or indirectly coupled to the motor/generator shaft 44 by the operation of another mechanism, such as clutching, as discussed further below.

In certain embodiments, the motor/generator shaft 44 can extend out of a second end 52 of the motor-generator 38. Generally, the first and second ends 50, 52 of the motor-generator 38 are spaced from each other along the first axis 46. Specifically, the motor-generator 38 can include a housing having the first and second ends 50, 52. Therefore, the motor/generator shaft 44 is at least partially disposed inside the housing of the motor-generator 38. It is to be appreciated that one or more bearings can rotatably support the motor/generator shaft 44. It is to also be appreciated that the rotatable element 48 can be a sprocket, etc., instead of a pulley.

The motor-generator 38 of the powertrain 12 may include a stator and a rotor spaced from the stator. The rotor is attached to the motor/generator shaft 44 such that the rotor and the motor/generator shaft 44 are rotatable in unison about the first axis 46 relative to the stator. Simply stated, the rotor and the motor/generator shaft 44 are rotatable as a unit about the first axis 46 while the stator remains stationary. The stator is in electrical communication with the first and/or second energy storage devices 40, 42. For example, when the motor-generator 38 is functioning as the motor, current stored in the first and/or second energy storage devices 40, 42 can be supplied to the stator/rotor to cause rotation of the rotor and ultimately start the engine 14 and/or supply supplemental torque to the engine 14. As another example, when the motor-generator 38 is functioning as the generator, torque from the rotor rotating about the first axis 46 is converted into electrical current which can be stored in the first and/or second energy storage devices 40, 42 for later use.

The motor-generator 38 can operate in various modes to perform various functions. For example, the motor-generator 38 can operate in the regenerative operating mode to generate current by rotating the rotor of the motor-generator 38 relative to the stator of the motor-generator 38. Simply stated, the motor-generator 38 can operate as a generator when in the regenerative operating mode. The regenerative operating mode can occur when the vehicle 10 is motoring at a certain speed and is not braking/slowing down the vehicle 10. As another example, the motor-generator 38 can operate in a boost operating mode, i.e., a torque assist operating mode, to provide torque to the wheels 20 of the vehicle 10 (utilizing the endless rotatable device 58 discussed below). Simply stated, the motor-generator 38 can operate as a motor when in the boost operating mode. As yet another example, the motor-generator 38 can operate in a regenerative braking mode to generate current during braking, i.e., slowing down, of the vehicle 10 by rotating the rotor of the motor-generator 38 relative to the stator of the motor-generator 38. Simply stated, the motor-generator 38 can operate as a generator when in the regenerative braking mode.

The motor-generator 38 may also include an electrical device that can include an integrated power inverter 54. Accordingly, the motor-generator 38 may be referred to as the motor-generator-inverter 38. The stator can be in electrical communication with the integrated power inverter 54, and the integrated power inverter 54 can be selectively in electrical communication with the first and/or second energy storage devices 40, 42. The integrated power inverter 54 can convert direct current (DC) provided by the first and/or second energy storage devices 40, 42 to alternating current (AC) to power the motor-generator 38 to function as the motor. Furthermore, the integrated power inverter 54 can convert AC to DC to be stored in the first and/or second energy storage devices 40, 42 when the motor-generator 38 functions as the generator. Additionally, the integrated power inverter 54 can convert AC to DC to supply current to an auxiliary electric system 56. Also, the integrated power inverter 54 can convert AC to DC to selectively supply current to the first and/or second energy storage devices 40, 42. Generally, the integrated power inverter 54 can be in electrical communication with the stator to operate the motor-generator 38 as the motor or as the generator. The motor-generator 38 can include other electrical devices, such as one or more sensors (such as for example, a motor position sensor that detects the position of the motor/generator shaft 44), controllers, fans to cool electrical components, etc. Furthermore, the integrated power inverter can include one or more brushes, one or more brush holders, a field control electronic device when using a wound field machine, etc.

The powertrain 12 may further include the endless rotatable device 58, i.e., a device having no ends, disposed about the crankshaft pulley 34 and the motor/generator pulley 48. Specifically, the endless rotatable device 58 is disposed about the crankshaft pulley 34 and the motor/generator pulley 48 to transfer rotational movement between the crankshaft pulley 34 and the motor/generator pulley 48. In other words, the endless rotatable device 58 is disposed about the crankshaft pulley 34 and the motor/generator pulley 48 to selectively transfer torque between the crankshaft 22 and the motor/generator shaft 44. For example, in certain operations, rotation of the motor/generator pulley 48 by the endless rotatable device 58 can correspondingly rotate the motor/generator shaft 44, etc.

In certain embodiments, the endless rotatable device 58 is a belt. The belt can be a ribbed belt, a flat belt or any other suitable configuration. The motor-generator 38 can be coupled to the engine 14 by the endless rotatable device 58. Specifically, the motor-generator 38 can be coupled to the crankshaft 22 of the engine 14 by the endless rotatable device 58 and the pulleys 34, 48. In certain embodiments, the endless rotatable device 58 can be a chain instead of the belt and sprockets can be utilized with the chain instead of the pulleys 34, 48.

The powertrain 12 also includes a starter mechanism 60 coupleable to the engine 14. The starter mechanism 60 can be various configurations. The starter mechanism 60 is coupleable to the engine 14 through engagement with the ring gear 30. Furthermore, the motor-generator 38 may also be coupleable to the engine 14 through the starter mechanism 60. Accordingly, the motor-generator 38 may be used to power the starter mechanism 60 to start the engine 14. Alternatively, the starter mechanism 60 may be separate from and operate independently of the motor-generator 38. The specific configuration and operation of the starter mechanism is not pertinent to the detailed description of this disclosure, and is therefore not described in detail herein. However, it should be appreciated that the starter mechanism may be configured in several different ways.

Furthermore, the powertrain 12 may include the auxiliary electric system 56, which is shown in electrical communication with the motor-generator 38. The auxiliary electric system 56 can include one or more accessory devices of the vehicle 10. For example, the auxiliary electric system 56 can include headlights, HVAC devices, auxiliary motors, entertainment system components, etc. In certain embodiments, the integrated power inverter 54 is in electrical communication with the auxiliary electric system 56 to convert AC produced by the motor-generator 38 to DC. Therefore, the DC can be utilized by the auxiliary electric system 56 to power various accessories.

The powertrain 12 includes the first energy storage device 40, which is disposed in a parallel electrical relationship with the motor-generator 38 and the auxiliary electric system 56. In other words, the first energy storage device 40 is disposed in a parallel circuit arrangement with the motor-generator 38 and the auxiliary electric system 56. The first energy storage device 40 can be any suitable battery or other device that can store current for later use.

The powertrain 12 may also include a first switching device 62 selectively transitionable between a first open state to electrically disconnect the first energy storage device 40 from at least one of the motor-generator 38 and the auxiliary electric system 56, and a first closed state to electrically connect the first energy storage device 40 to at least one of the motor-generator 38 and the auxiliary electric system 56. Therefore, electrical communication between the motor-generator 38 and the auxiliary electric system 56 is independent of the first switching device 62 being in the first open and closed states. Therefore, the location of the first switching device 62 does not interfere with the electrical communication between the motor-generator 38 and the auxiliary electric system 56. In other words, the motor-generator 38 and the auxiliary electric system 56 can be in electrical communication with each other independently of which state the first switching device 62 is in. The first energy storage device 40 is disposed between an electrical bus 63 and an electrical ground 65, and the first switching device 62 is disposed between the first energy storage device 40 and the electrical bus 63 such that the first energy storage device 40 is in direct electrical communication with the electrical bus 63 when the first switching device 62 is in the first closed state. The electrical bus 63 can be a high-voltage DC bus and/or a low-voltage DC bus.

The phrase "at least one of" as used herein should be construed to include the non-exclusive logical "or", i.e., at least one of the motor-generator 38 or the auxiliary electric system 56. Therefore, in certain embodiments, the first energy storage device 40 is in electrical communication with the motor-generator 38 or the auxiliary electric system 56. In other embodiments, the first energy storage device 40 is in electrical communication with both of the motor-generator 38 and the auxiliary electric system 56.

In general, the first switching device 62 is used to selectively block the flow of current to the first energy storage device 40. When the first switching device 62 is in the first closed state, the electrical circuit to the first energy storage device 40 is completed or closed and current can flow to or from the first energy storage device 40. When the first switching device 62 is in the first open state, the electrical circuit is separated or open and current cannot flow to or from the first energy storage device 40. The first open state is shown in solid lines in FIG. 1.

The first switching device 62 may include a unidirectional blocking switch or a bidirectional blocking switch. In one configuration, the first switching device 62 is a solid-state switch. The first switching device 62 can be a binary switch, a contact switch, a relay switch, etc. The first switching device 62 is schematically illustrated in FIG. 1 for illustrative purposes only and should not be construed as any particular type of switch.

The exemplary embodiment of the powertrain 12 includes the second energy storage device 42 disposed in a parallel electrical relationship with the first energy storage device 40, the motor-generator 38 and the auxiliary electric system 56. However, it should be appreciated that in other embodiments, the powertrain 12 may not include the second energy storage device 42 and other components specifically related to the second energy storage device 42.

Generally, the first energy storage device 40 is a high-voltage energy storage device, and the second energy storage device 42 is a low-voltage energy storage device that is in electrical communication with the auxiliary electric system 56. The first energy storage device 40 is utilized to selectively supply current/voltage to the motor-generator 38 and the second energy storage device 42 is utilized to selectively supply current/voltage to the auxiliary electric system 56. The first energy storage device 40 and second energy storage device 42 can be any suitable battery or other device that can store current or energy for later use. One non-limiting example is that the high-voltage energy storage device can be a 48 volt DC battery and the low-voltage energy storage device can be a 12 volt DC battery. Another non-limiting example is the high-voltage energy storage device can be a 24-48 volt DC multi-cell rechargeable lithium ion battery or an ultracapacitor, while the low-voltage energy storage device can be a 12 volt DC lead acid or lithium ion battery. As yet another example, the first and second energy storage devices 40, 42 can have substantially the same voltage levels.

Furthermore, the powertrain 12 may include a second switching device 68 selectively transitionable between a second open state to electrically disconnect the second energy storage device 42 from at least one of the motor-generator 38 and the auxiliary electric system 56, and a second closed state to electrically connect the second energy storage device 42 to at least one of the motor-generator 38 and the auxiliary electric system 56. Electrical communication between the motor-generator 38 and the auxiliary electric system 56 is independent of the second switching device 68 being in the second open and closed states. Therefore, the location of the second switching device 68 does not interfere with the electrical communication between the motor-generator 38 and the auxiliary electric system 56. In other words, the motor-generator 38 and the auxiliary electric system 56 can be in electrical communication with each other independently of which state the second switching device 68 is in. The second energy storage device 42 is disposed between the electrical bus 63 and the electrical ground 65, and the second switching device 68 is disposed between the second energy storage device 42 and the electrical bus 63 such that the second energy storage device 42 is in direct electrical communication with the electrical bus 63 when the second switching device 68 is in the second closed state. Therefore, due to the location of the first and second switching devices 62, 68, current can selectively flow to/from the first and second energy storage devices 40, 42 independently of each other.

As discussed above, the phrase "at least one of" should be construed to include the non-exclusive logical "or", i.e., at least one of the motor-generator 38 or the auxiliary electric system 56. Therefore, in certain embodiments, the second energy storage device 42 is in electrical communication with the motor-generator 38 or the auxiliary electric system 56. In other embodiments, the second energy storage device 42 is in electrical communication with both of the motor-generator 38 and the auxiliary electric system 56.

Generally, the second switching device 68 is used to selectively block the flow of current to the second energy storage device 42. When the second switching device 68 is in the second closed state, the electrical circuit to the second energy storage device 42 is completed or closed and current can flow to or from the second energy storage device 42. When the second switching device 68 is in the second open state, the electrical circuit is separated or open and current cannot flow to or from the second energy storage device 42. The second open state is shown in solid lines in FIG. 1.

The second switching device 68 can be a unidirectional blocking switch or a bidirectional blocking switch. In one configuration, the second switching device 68 is a solid-state switch. The second switching device 68 can be a binary switch, a contact switch, a relay switch, etc. The second switching device 68 is schematically illustrated in these Figures for illustrative purposes only and should not be construed as any particular switch.

Optionally, the powertrain 12 may include an electrical component 64 disposed downstream to the motor-generator 38 and the first energy storage device 40 along the electrical bus 63. Furthermore, the electrical component 64 is disposed upstream to the auxiliary electric system 56 along the electrical bus 63. Downstream as used herein is the direction flowing from the motor-generator 38 toward the auxiliary electric system 56 along the electrical bus 63 and the arrow 66 in each of the Figures point in the downstream direction. Generally, when utilizing the electrical component 64, the electrical component 64 is disposed in a series electrical relationship, i.e., a series circuit arrangement, with the motor-generator 38 and the auxiliary electric system 56. In certain embodiments, the electrical component 64 can include a DC-DC converter. In other embodiments, the electrical component may include a switching device.

The motor-generator 38 may further include a motor/generator clutch 70 for selectively connecting and disconnecting rotation between the motor/generator pulley 48 and the motor/generator shaft 44. The motor/generator pulley 48 is coupleable to the motor/generator shaft 44 through the selective operation of the motor/generator clutch 70. Therefore, the motor/generator pulley 48 is selectively coupled to the motor/generator shaft 44 through the operation of the motor/generator clutch 70. The motor/generator clutch 70 can be disposed adjacent to the motor/generator pulley 48 or adjacent to the first end 50 of the motor-generator 38. Actuation of the motor/generator clutch 70 allows various operations of the motor-generator 38 without transferring rotation between the crankshaft pulley 34 and the motor/generator pulley 48 by the endless rotatable device 58. The motor/generator clutch 70 can include a solenoid 72 to selectively actuate the motor/generator clutch 70. It is to be appreciated that the motor/generator clutch 70 can be any suitable type of clutch.

The powertrain 12 further includes a hybrid system controller 96, which can be part of an electronic control module that is in communication with various components of the vehicle 10. Generally, the hybrid system controller 96 signals various components of the vehicle 10 to selectively operate, some of which are discussed below. It is to be appreciated that the hybrid system controller 96 may include more than one controller.

The hybrid system controller 96 includes a processor 98 and a memory 100 on which is recorded instructions for communicating with the motor-generator 38, the starter mechanism 60, the first and/or second energy storage devices 40, 42, the first, and second switching devices 62, 68, and the electrical component 64. The hybrid system controller 96 is configured to execute the instructions from the memory 100, via the processor 98. For example, the hybrid system controller 96 can be a host machine or distributed system, e.g., a computer such as a digital computer or microcomputer, acting as a vehicle control module, and/or as a proportional-integral-derivative (PID) controller device having a processor, and, as the memory 100, tangible, non-transitory computer-readable memory such as read-only memory (ROM) or flash memory. The hybrid system controller 96 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the hybrid system controller 96 can include all software, hardware, memory 100, algorithms, connections, sensors, etc., necessary to monitor and control the motor-generator 38, the starter mechanism 60, the first and second switching devices 62, 68, and the electrical device 64. Furthermore, the hybrid system controller 96 can include all software, hardware, memory 100, algorithms, connections, sensors, etc., necessary to monitor the first and/or second energy storage devices 40, 42. As such, a control method can be embodied as software or firmware associated with the hybrid system controller 96. It is to be appreciated that the hybrid system controller 96 can also include any device capable of analyzing data from various sensors, comparing data, making the necessary decisions required to control and monitor the motor-generator 38, the starter mechanism 60, the first and second switching devices 62 68, and the electrical component 64, as well as monitor the first and/or second energy storage devices 40, 42.

The hybrid system controller 96 is in communication with the motor-generator 38, the starter mechanism 60, the first switching device 62, the second switching device 68, the third switching electrical component 64, the first energy storage device 40, and/or the second energy storage device 42, to selectively operate the motor-generator 38, the starter mechanism 60, the first switching device 62, the second switching device 68, the electrical component 64, and the first and second energy storage devices 40, 42. The hybrid system controller 96 selectively signals the different switching devices 62, 68 to establish one of either an open state or a closed state. Additionally, the hybrid system controller 96 may signal actuators of the starter mechanism 60 or the motor/generator clutch 70 to establish either an actuated position or an un-actuated position, to achieve the desired operation, such as the regenerative operating mode, the boost operating mode, the regenerative braking mode, a cold-engine start mode, an auto-engine start mode, etc.

Furthermore, the hybrid system controller 96 can be in communication with the first energy storage device 40. When the first switching device 62 is in the first closed state, current can flow into the first energy storage device 40 or flow out of the first energy storage device 40, and the hybrid system controller 96 can monitor the amount of current in the first energy storage device 40. Additionally, the hybrid system controller 96 can be in communication with and control the operation of the integrated power inverter 54.

The hybrid system controller 96 is also in communication with the second energy storage device 42, and with the second switching device 68 to selectively signal the second switching device 68 to establish one of the second open state and the second closed state. Therefore, depending on the desired operation, the hybrid system controller 96 signals the second switching device 68 to be in one of the second open state and the second closed state. When the second switching device 68 is in the second closed state, current can flow into the second energy storage device 42 or flow out of the second energy storage device 42, and the hybrid system controller 96 can monitor the amount of current in the second energy storage device 42.

The hybrid system controller 96 receives current from the first energy storage device 40. Specifically, the hybrid system controller 96 remains in electrical communication with the first energy storage device 40 independently of which state the first switching device 62 is in. In other words, the electrical connection to the hybrid system controller 96 is disposed between the first energy storage device 40 and the first switching device 62 such that current can continuously flow to the hybrid system controller 96 without being affected by the state that the first switching device 62 is in.

Figure 2:
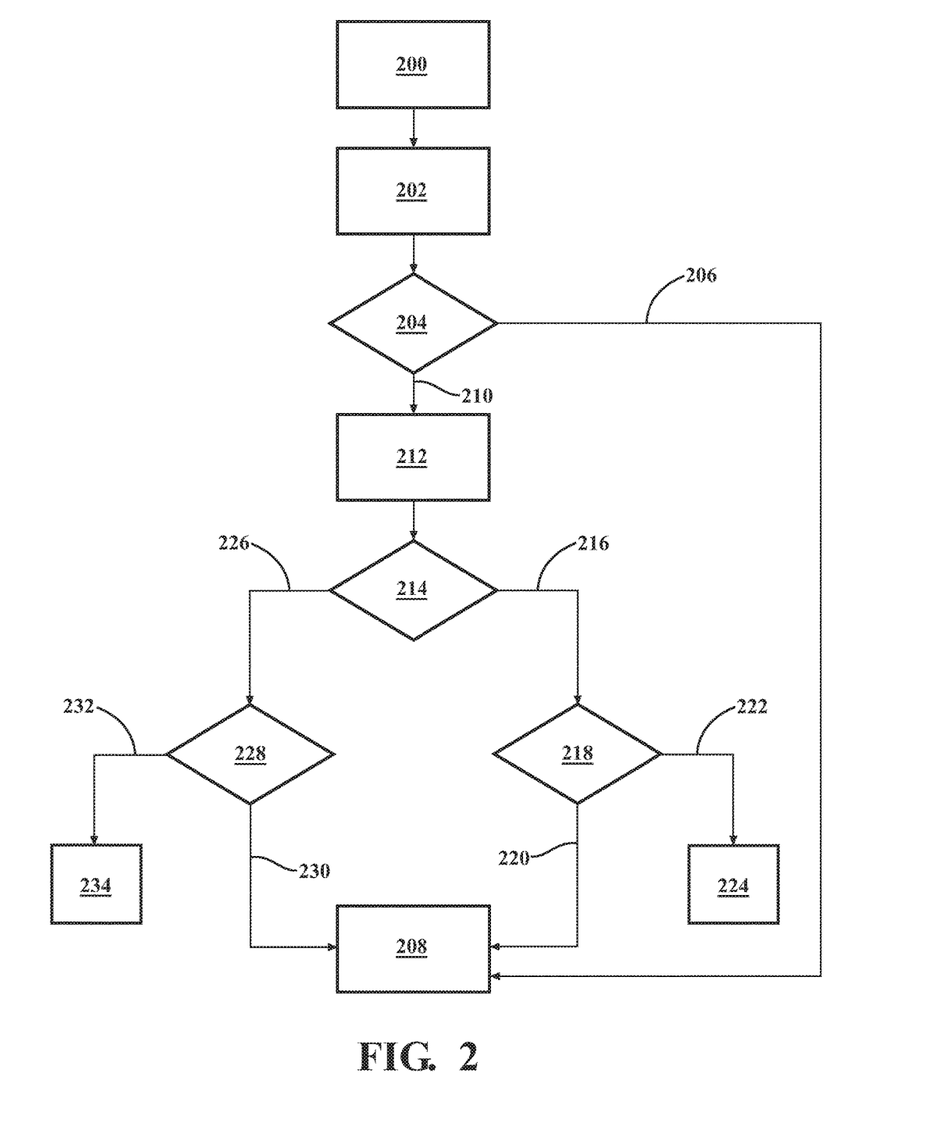
FIG. 2 is a flow chart representing a method of controlling the powertrain of the vehicle.

A method of controlling the powertrain 12 of the vehicle 10 described above is presented below. The method is used to control operation of the motor-generator 38 in either the regenerative operating mode or the boost operating mode. Referring to FIG. 2, the method includes the hybrid system controller 96 selecting one of either the boost operating mode or the regenerative operating mode for the motor-generator 38. Selecting the operating mode for the motor-generator 38 is generally indicated by box 200 in FIG. 2. The hybrid system controller 96 may select the desired operating mode based on the current operating conditions of the vehicle 10, such as speed, charge level of the first energy storage device 40, engine torque request, etc. The specific manner and the conditions in which the hybrid system controller 96 selects either the boost operating mode or the regenerative operation mode are not pertinent to the teachings of this disclosure, and are therefore not discussed in detail herein.

Once the hybrid system controller 96 has selected either the boost operating mode or the regenerative operation mode, a temperature of the motor-generator 38 is sensed. Sensing the temperature of the motor-generator 38 is generally indicated by box 202 in FIG. 2. The temperature of the motor-generator 38 may be sensed in any suitable manner, including but not limited to sensing the temperature of the motor-generator 38 with an internal temperature sensor incorporated into the motor-generator 38. Additionally, it is contemplated that the temperature of the motor-generator 38 may be sensed at several different locations, such as at end turns of the motor-generator 38, the housing of the motor-generator 38, or at power switches of the inverter. When multiple temperatures of the motor-generator 38 are sensed, the lowest temperature among these measurements is used as the sensed temperature of the motor-generator 38. The temperature of the motor-generator 38 is communicated to the hybrid system controller 96, and stored in the memory 100 of the hybrid system controller 96.

The hybrid system controller 96 then compares the sensed temperature of the motor-generator 38 to a Motor Generator Inverter (MGI) temperature threshold to determine if the sensed temperature of the motor-generator 38 is equal to or greater than the MGI temperature threshold, or if the sensed temperature of the motor-generator 38 is less than the MGI temperature threshold. Comparing the sensed temperature of the motor-generator 38 to the MGI temperature threshold is generally indicated by box 204 in FIG. 2. The MGI temperature threshold may be defined to equal any desired temperature. For example, the MGI temperature threshold may be defined to equal a temperature of approximately 165° C. It should be appreciated that the MGI temperature threshold may be defined to equal a temperature outside of the exemplary range noted above, and may depend upon the specific operating parameters of the motor-generator 38, and the specific application.

If the hybrid system controller 96 determines that the sensed temperature of the motor-generator 38 is equal to or greater than the MGI temperature threshold, generally indicated at 206, then the hybrid system controller 96 may prohibit operation of the motor-generator 38 in either the boost operating mode or the regenerative operating mode, and place the motor-generator 38 in a standby mode. Placing the motor-generator 38 in standby mode is generally indicated by box 208 in FIG. 2. Alternatively, if the hybrid system controller 96 determines that the sensed temperature of the motor-generator 38 is less than the MGI temperature threshold, generally indicated at 210, then the hybrid system controller 96 may allow operation of the motor-generator 38 in either the boost operating mode or the regenerative operating mode, and the process continues as described below.

If the hybrid system controller 96 determines that the sensed temperature of the motor-generator 38 is less than the MGI temperature threshold, generally indicated at 210, then the hybrid system controller 96 calculates an operating efficiency of the motor-generator 38. Calculation of the operating efficiency of the motor-generator 38 is generally indicated by box 212 in FIG. 2. When the motor-generator 38 is operating as a motor, the operating efficiency of the motor-generator 38 is defined herein as the shaft power divided by the input power, measured at the inverter DC side of the motor-generator 38. When the motor-generator 38 is operating as a generator, the operating efficiency of the motor-generator 38 is defined herein as the output power of the motor-generator 38, measured at the inverter DC side of the motor-generator 38, divided by the shaft power of the motor-generator 38. The operating efficiency of the motor-generator 38 may be calculated as a percentage of a total possible performance value. For example, an operating efficiency may be calculated to equal 60% of a possible operating performance level.

The hybrid system controller 96 may calculate or otherwise define or determine the operating efficiency of the motor-generator 38 in any suitable manner. For example, the hybrid system controller 96 may calculate the operating efficiency of the motor-generator 38 by referencing a look-up table stored in the memory 100 of the hybrid system controller 96, which relates torque output from the motor-generator 38 to a rotational speed of the motor-generator 38, within a specific voltage range of the first energy storage device 40, to define a value. Accordingly, the hybrid system controller 96 may include several different graphs, charts, tables, etc., stored in the memory 100 of the hybrid system controller 96. Each table relates torque output from the motor-generator 38 to a rotational speed of the motor-generator 38 for a specific voltage or range of voltages of the first energy storage device 40. For example, the hybrid system controller 96 may include a first table for voltages of approximately 12 V, for example, between the by and 12V, and second table for voltages of approximately 16V, for example, between 14V and 17V. The hybrid system controller 96 may include any number of tables for the different voltage values and/or ranges of the first energy storage device 40. Accordingly, the hybrid system controller 96, will sense or otherwise determine the torque output from the motor-generator 38, the rotational speed of the motor-generator 38, and the current voltage of the first energy storage device 40. The hybrid system controller 96 then refers to the appropriate table for the current voltage of the first energy storage device 40, and uses the torque output and the rotational speed of the motor-generator 38 to define the value of the operating efficiency of the motor-generator 38.

Once the hybrid system controller 96 has determined the value of the operating efficiency of the motor-generator 38, then the hybrid system controller 96 may adjust the value by a temperature adjustment factor to define the operating efficiency of the motor-generator 38. The temperature adjustment factor is dependent upon the temperature of the motor-generator 38, and is multiplied with the value to define the operating efficiency of the motor-generator 38. Accordingly, the value that the hybrid system controller 96 determines from the tables described above, may be adjusted to account for inefficiency's caused by high temperatures. The exact value of the temperature adjustment value may vary, and is dependent upon the current temperature of the motor-generator 38. For example, the temperature adjustment value may include a decimal multiplier that is multiplied by the value to define the operating efficiency of the motor-generator 38. Accordingly, the temperature adjustment value may be defined to include a value of 1.00, in order to not adjust the value. However, the temperature adjustment value may be defined to include a value less than 1.00 to the defined value of the operating efficiency of the motor-generator 38. For example, the temperature adjustment value may decrease with an increase in the temperature of the motor-generator 38, because the motor-generator 38 is less efficient at higher temperatures.

Once the hybrid system controller 96 has adjusted the value to define the operating efficiency of the motor-generator 38, the hybrid system controller 96 then determines if the boost operating mode has been selected, or if the regenerative operating mode has been selected. Determination of the selected operating mode is generally indicated by box 214 in FIG. 2. When the boost operating mode is selected, generally indicated at 216, then the hybrid system controller 96 compares the operating efficiency of the motor-generator 38 to an upper MGI efficiency threshold to determine if the operating efficiency of the motor-generator 38 is equal to or greater than the upper MGI efficiency threshold, or if the operating efficiency of the motor-generator 38 is less than the upper MGI efficiency threshold. Comparison of the operating efficiency of the motor-generator 38 to the upper MGI efficiency threshold is generally indicated by box 218 in FIG. 2. The upper MGI efficiency threshold is preferably defined to include a value between 60% and 90%. For example, the upper MGI efficiency threshold may be defined to equal a value of 70%.

If the hybrid system controller 96 determines that the operating efficiency of the motor-generator 38 is less than the upper MGI efficiency threshold, generally indicated at 220, and the boost operating mode has been selected, generally indicated at 216, then the hybrid system controller 96 may signal a low operating efficiency of the motor-generator 38, not allow operation of the motor-generator 38 in the boost operating mode, and place the motor-generator 38 in the standby mode, generally indicated by box 208 in FIG. 2. However, if the hybrid system controller 96 determines that the operating efficiency of the motor-generator 38 is equal to or greater than the upper MGI efficiency threshold, generally indicated at 222 and the boost operating mode has been selected, generally indicated at 216, then the hybrid system controller 96 controls the motor-generator 38 to operate the motor-generator 38 in the boost operating mode. Controlling the operation of the motor-generator 38 to operate in the boost operating mode is generally indicated by box 224 in FIG. 2. As described above, the motor-generator 38 draws electrical power from the first energy storage device 40 for generating torque, which is applied to the internal combustion engine to assist in propelling the vehicle 10.

Once the hybrid system controller 96 has adjusted the value to define the operating efficiency of the motor-generator 38, and when the regenerative operating mode is selected, generally indicated at 226, then the hybrid system controller 96 compares the operating efficiency of the motor-generator 38 to a lower MGI efficiency threshold to determine if the operating efficiency of the motor-generator 38 is equal to or greater than the lower MGI efficiency threshold, or if the operating efficiency of the motor-generator 38 is less than the lower MGI efficiency threshold. Comparison of the operating efficiency of the motor-generator 38 to the lower MGI efficiency threshold is generally indicated by box 228 in FIG. 2. The lower MGI efficiency threshold is preferably defined to include a value between 20% and 50%. For example, the upper MGI efficiency threshold may be defined to equal a value of 30%.

If the hybrid system controller 96 determines that the operating efficiency of the motor-generator 38 is less than the lower MGI efficiency threshold, generally indicated at 230, and the regenerative operating mode has been selected, generally indicated at 226, then the hybrid system controller 96 may signal a low operating efficiency of the motor-generator 38, not allow operation of the motor-generator 38 in the regenerative operating mode, and place the motor-generator 38 in the standby mode, generally indicated by box 208 in FIG. 2. However, if the hybrid system controller 96 determines that the operating efficiency of the motor-generator 38 is equal to or greater than the lower MGI efficiency threshold, generally indicated at 232, and the regenerative operating mode has been selected, generally indicated at 226, then the hybrid system controller 96 controls the motor-generator 38 to operate the motor-generator 38 in the regenerative operating mode. Controlling the operation of the motor-generator 38 to operate in the regenerative operating mode is generally indicated by box 234 in FIG. 2. As described above, the motor-generator 38 receives torque from the internal combustion engine for generating electricity for charging the first and/or second energy storage devices 40, 42 when operating in the regenerative operating mode.

Figure 3:
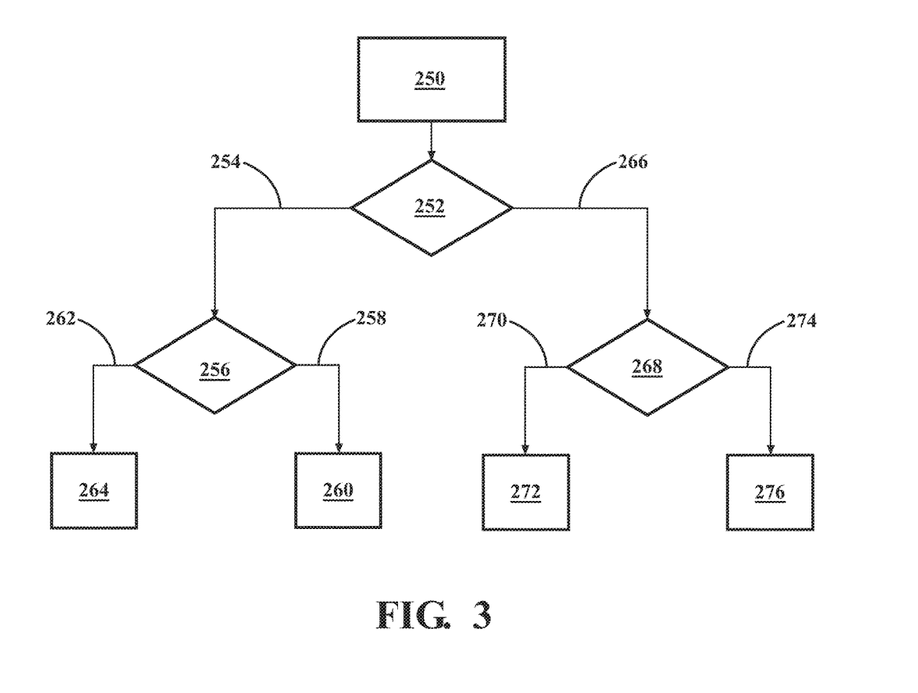
FIG. 3 is a flow chart representing a method of controlling a motor-generator in either a boost operating mode or a regenerative operating mode.

Controlling the motor-generator 38 to operate in either the boost operating mode, generally indicated by box 224 in FIG. 2, or the regenerative operating mode, generally indicated by box 234 in FIG. 2, is described below with reference to FIG. 3. Operating the motor-generator 38 in either the boost operating mode or the regenerative operating mode includes calculating a machine terminal voltage with the hybrid system controller 96. The efficiency improvement of the motor-generator 38 is also related to the Pulse Width Modulation (PWM) control scheme. Selection of the PWM controls scheme depends on the type or configuration of the motor-generator 38, and also on the terminal voltage of the machine. Calculation of the machine terminal voltage is generally indicated by box 250 in FIG. 3. The hybrid system controller 96 may calculate the machine terminal voltage in any suitable manner. For example, the hybrid system controller 96 may calculate the machine terminal voltage by using the output of a closed-loop current controller or measured terminal voltage from the power switched devices. The calculated value is then normalized to eliminate the fluctuation of battery voltage. The base value for voltage is normally half of battery voltage. For example, for a 12V battery voltage, the base value is approximately equal to 6V. The normalized terminal voltage may be expressed in terms of a decimal fraction of a total possible voltage.

The process of controlling the motor-generator 38 to operate in either the boost operating mode or the regenerative operating mode depends on whether or not the motor-generator 38 is a switched reluctance machine, or is not a switched reluctance machine. Selection of a PWM control scheme for a switched reluctance machine is special. Accordingly, the hybrid system controller 96 determines if the motor-generator 38 is a switched reluctance machine, or is not a switched reluctance machine. Determination of whether or not the motor-generator 38 is a switched reluctance machine is generally indicated by box 252 in FIG. 3. As used herein, a switched reluctance machine is defined as a simple and low cost electrical machine, in which its stator and rotor are made of stacks of ferromagnetic laminations having salient poles. Each stator pole has concentric winding. Suitable coils are connected together to form the machine phases. A switched reluctance machine has no distributed windings, no brushes, no permanent magnets, no windings on the rotor, and no cage.

If the hybrid system controller 96 determines that the motor-generator 38 is not a switched reluctance machine, generally indicated at 254, then the hybrid system controller 96 then compares the machine terminal voltage to a voltage threshold to determine if the machine normalized terminal voltage is equal to or greater than the voltage threshold, or if the machine normalized terminal voltage is less than the voltage threshold. Comparison of the machine normalized terminal voltage to the voltage threshold is generally indicated by box 256 in FIG. 3. The voltage threshold may be defined to equal a decimal value. For example, the voltage threshold may be defined to include a value between 0.70 and 0.90. More specifically, the voltage threshold may be defined to equal a value of 0.80. However, it should be appreciated that the voltage threshold may be defined to equal a value outside of the exemplary range noted above.

If the hybrid system controller 96 determines that the machine normalized terminal voltage is equal to or greater than the voltage threshold, generally indicated at 258, then the hybrid system controller 96 uses space vector control pulse width modulation to control the operation of the motor-generator 38 in either the boost operating mode of the regenerative operating mode. Controlling the motor-generator 38 with space vector control pulse width modulation is generally indicated by box 260 in FIG. 3. Space vector control pulse width modulation is an algorithm for the control of pulse width modulation (PWM). Space vector modulation is used for the creation of alternating current waveforms; most commonly to drive 3 phase AC powered motors at varying speeds from DC source. The reference signal is normally generated using a combination of the two adjacent active switching vectors and one or both of the zero vectors. Space vector control pulse width modulation is a common algorithm of PWM, is understood by a person skilled in the art, and is therefore not described in detail herein.

If the hybrid system controller 96 determines that the machine terminal voltage is less than the voltage threshold, generally indicated at 262, then the hybrid system controller 96 uses discontinuous pulse width modulation to control the operation of the motor-generator 38 in either the boost operating mode of the regenerative operating mode. Controlling the motor-generator 38 with discontinuous pulse width modulation is generally indicated by box 264 in FIG. 3. Discontinuous pulse width modulation is a modulation method to form sinusoidal currents by switching only two rectifier phase legs while the third phase leg (where the selected phase changes in a cyclic manner over one main period) is clamped to an output voltage bus. This can be obtained by using zero-sequence discontinuous-type signal to augment the sinusoidal reference. Discontinuous pulse width modulation is a common algorithm of PWM, is understood by a person skilled in the art, and is therefore not described in detail herein.

If the hybrid system controller 96 determines that the motor-generator 38 is a switched reluctance machine, generally indicated at 266, then the hybrid system controller 96 compares the rotational speed of the rotor of the electric motor-generator 38 to a rotor threshold, to determine if the rotational speed of the rotor is equal to or less than the rotor threshold, or if the rotational speed of the rotor is greater than the rotor threshold. Comparison of the rotational speed of the rotor to the rotor threshold is generally indicated by box 268 in FIG. 3. The rotor threshold may be defined to equal any rotational speed suitable for the specific design and configuration of the motor-generator 38. Preferably, the rotor threshold is between 80% and 120% of a base speed. The base speed is the speed at which the back electromotive force is equal to the supply voltage. More preferably, the rotor threshold is approximately equal to 100% of the base speed. However, it should be appreciated that the rotor threshold may be defined to equal a value outside the exemplary range noted above.

If the motor-generator 38 is a switched reluctance machine, generally indicated at 266, and the hybrid system controller 96 determines that the rotational speed of the rotor is equal to or less than the rotor threshold, generally indicated at 270, then the hybrid system controller 96 uses current control with pulse width modulation to control the operation of the motor-generator 38 in either the boost operating mode of the regenerative operating mode. Controlling the motor-generator 38 using current control with pulse width modulation is generally indicated by box 272 in FIG. 3. As used herein, current control with pulse width modulation is a technique used to limit the maximum phase current of a switched reluctance machine by controlling the average voltage of a phase. Current control with pulse width modulation is understood by those skilled in the art, and is therefore not described in detail herein.

If the motor-generator 38 is a switched reluctance machine, generally indicated at 266, and the hybrid system controller 96 determines that the rotational speed of the rotor is greater than the rotor threshold, generally indicated at 274, then the hybrid system controller 96 uses single pulse mode to control the operation of the motor-generator 38 in either the boost operating mode of the regenerative operating mode. Controlling the motor-generator 38 using single pulse mode is generally indicated by box 276 in FIG. 3. As used herein, single pulse mode is a control technique during which a phase current of a switched reluctance machine is smaller than the defined maximum value of the phase current. Single pulse mode is understood by those skilled in the art, and is therefore not described in detail herein.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of controlling a powertrain of a vehicle, the powertrain including an internal combustion engine, an electric device selectively coupled to the internal combustion engine, and at least one energy storage device selectively coupled to the electric device, the method comprising:
   selecting one of either a boost operating mode or a regenerative operating mode for the electric device with a hybrid system controller;
   calculating an operating efficiency of the electric device with the hybrid system controller;
   comparing the operating efficiency of the electric device to an upper Motor-generator-inverter (MGI) efficiency threshold, with the hybrid system controller, to determine if the operating efficiency of the electric device is equal to or greater than the upper MGI efficiency threshold, or if the operating efficiency of the electric device is less than the upper MGI efficiency threshold, when the boost operating mode is selected;
   controlling the electric device, with the hybrid system controller, to operate the electric device in the boost operating mode when the operating efficiency of the electric device is equal to or greater than the upper MGI efficiency threshold, wherein the electric device draws electrical power from the at least one energy storage device for generating torque for the internal combustion engine;
   comparing the operating efficiency of the electric device to a lower MGI efficiency threshold, with the hybrid system controller, to determine if the operating efficiency of the electric device is equal to or greater than the lower MGI efficiency threshold, or if the operating efficiency of the electric device is less than the lower MGI efficiency threshold, when the regenerative operating mode is selected; and
   controlling the electric device, with the hybrid system controller, to operate the electric device in the regenerative operating mode when the operating efficiency of the electric device is equal to or greater than the lower MGI efficiency threshold, wherein the electric device receives torque from the internal combustion engine for generating electricity for charging the at least one energy storage device when operating in the regenerative operating mode.

2. The method set forth in claim 1 further comprising sensing a temperature of the electric device.

3. The method set forth in claim 2 further comprising comparing the sensed temperature of the electric device to a MGI temperature threshold to determine if the sensed temperature of the electric device is equal to or greater than the MGI temperature threshold, or if the sensed temperature of the electric device is less than the MGI temperature threshold.

4. The method set forth in claim 3 further comprising prohibiting operation of the electric device in either the boost operating mode or the regenerative operating mode when the sensed temperature of the electric device is equal to or greater than the MGI temperature threshold.

5. The method set forth in claim 3 further comprising allowing operation of the electric device in either the boost operating mode or the regenerative operating mode when the sensed temperature of the electric device is less than the MGI temperature threshold.

6. The method set forth in claim 1 further comprising signaling a low operating efficiency of the electric device when the boost operating mode is selected and the operating efficiency of the electric device is less than the upper MGI efficiency threshold.

7. The method set forth in claim 1 further comprising signaling a low operating efficiency of the electric device when the regenerative operating mode is selected and the operating efficiency of the electric device is less than the lower MGI efficiency threshold.

8. The method set forth in claim 1 wherein calculating the operating efficiency of the electric device includes referencing a look-up table stored in a memory of the hybrid system controller that relates torque output from the electric device to a rotational speed of the electric device, within a specific voltage range of the energy storage device, to define a value.

9. The method set forth in claim 8 further comprising adjusting the value by a temperature adjustment factor to define the operating efficiency of the electric device, wherein the temperature adjustment factor is dependent upon a temperature of the electric device, and is multiplied with the value to define the operating efficiency of the electric device.

10. The method set forth in claim 1 wherein controlling the electric device to operate in either the boost operating mode or the regenerative operating mode includes calculating a machine normalized terminal voltage with the hybrid system controller.

11. The method set forth in claim 10 further comprising comparing the machine terminal voltage to a voltage threshold to determine if the machine terminal voltage is equal to or greater than the voltage threshold, or if the machine terminal voltage is less than the voltage threshold.

12. The method set forth in claim 11 further comprising using discontinuous pulse width modulation to control the operation of the electric device in either the boost operating mode of the regenerative operating mode when the machine terminal voltage is equal to or greater than the voltage threshold.

13. The method set forth in claim 11 further comprising using space vector control pulse width modulation to control the operation of the electric device in either the boost operating mode of the regenerative operating mode when the machine terminal voltage is less than the voltage threshold.

14. The method set forth in claim 11 wherein the voltage threshold is between 0.70 and 0.90.

15. The method set forth in claim 1 wherein the upper MGI efficiency threshold is between 60% and 90%.

16. The method set forth in claim 1 wherein the lower MGI efficiency threshold is between 20% and 50%.

17. The method set forth in claim 1 wherein the electric device is a motor-generator.

18. The method set forth in claim 17 wherein the motor-generator includes an electrical inverter.

19. A vehicle comprising:
   an internal combustion engine;
   an electric device selectively coupled to the internal combustion, and operable in at least a boost operating mode and a regenerative operating mode;
   at least one energy storage device selectively coupled to the electric device; and
   a hybrid system controller operably coupled to the internal combustion engine, the electric device, and the at least one energy storage device;
   wherein the hybrid system controller includes a processor, a memory, and at least one algorithm stored on the memory of the hybrid system controller, with the at least one algorithm executable by the processor to:
      select one of either the boost operating mode or the regenerative operating mode for the electric device;

calculate an operating efficiency of the electric device;
compare the operating efficiency of the electric device to an upper Motor-generator-inverter (MGI) efficiency threshold to determine if the operating efficiency of the electric device is equal to or greater than the upper MGI efficiency threshold, or if the operating efficiency of the electric device is less than the upper MGI efficiency threshold, when the boost operating mode is selected;
control the electric device to operate the electric device in the boost operating mode when the operating efficiency of the electric device is equal to or greater than the upper MGI efficiency threshold, wherein the electric device draws electrical power from the at least one energy storage device for generating torque for the internal combustion engine;
compare the operating efficiency of the electric device to a lower MGI efficiency threshold to determine if the operating efficiency of the electric device is equal to or greater than the lower MGI efficiency threshold, or if the operating efficiency of the electric device is less than the lower MGI efficiency threshold, when the regenerative operating mode is selected; and
control the electric device to operate the electric device in the regenerative operating mode when the operating efficiency of the electric device is equal to or greater than the lower MGI efficiency threshold, wherein the electric device receives torque from the internal combustion engine for generating electricity for charging the at least one energy storage device when operating in the regenerative operating mode.

20. The vehicle set forth in claim 19 wherein the at least one algorithm is executable by the processor to prohibit operation of the electric device in either the boost operating mode or the regenerative operating mode when a sensed temperature of the electric device is equal to or greater than a MGI temperature threshold, and allow operation of the electric device in either the boost operating mode or the regenerative operating mode when the sensed temperature of the electric device is less than the MGI temperature threshold.

* * * * *